United States Patent
Kwon et al.

(10) Patent No.: US 9,248,426 B2
(45) Date of Patent: *Feb. 2, 2016

(54) ADSORBENT FOR CARBON DIOXIDE, METHOD OF PREPARING THE SAME, AND CAPTURE MODULE FOR CARBON DIOXIDE

(71) Applicant: Samsung Electronics Co., Ltd., Suwon-Si, Gyeonggi-Do (KR)

(72) Inventors: Hyuk Jae Kwon, Suwon-si (KR); Jeong Gil Seo, Yongin-si (KR); Soon Chul Kwon, Hwaseong-si (KR); Hyun Chul Lee, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,139

(22) Filed: Jan. 25, 2013

(65) Prior Publication Data

US 2013/0199373 A1 Aug. 8, 2013

(30) Foreign Application Priority Data

Feb. 2, 2012 (KR) .................. 10-2012-0010987
Jan. 15, 2013 (KR) .................. 10-2013-0004586

(51) Int. Cl.
*B01D 53/02* (2006.01)
*B01J 20/04* (2006.01)
(Continued)

(52) U.S. Cl.
CPC ............ *B01J 20/048* (2013.01); *B01D 53/02* (2013.01); *B01J 20/027* (2013.01); *B01J 20/0259* (2013.01); *B01J 20/0266* (2013.01); *B01J 20/08* (2013.01); *B01J 20/3078* (2013.01); *B01J 20/3085* (2013.01); *B01D 2251/402* (2013.01);
(Continued)

(58) Field of Classification Search
CPC ............... B01D 2251/402; B01D 2253/1124; B01D 2253/25; B01D 2257/504; B01D 53/02; B01J 20/0259; B01J 20/0266; B01J 20/027; B01J 20/048; B01J 20/08; B01J 20/3078; B01J 20/3085; Y02C 10/08
See application file for complete search history.

(56) References Cited

U.S. PATENT DOCUMENTS 5,075,087 A  12/1991 Kosin et al.
5,624,646 A   4/1997 Phillips et al.
(Continued)

FOREIGN PATENT DOCUMENTS

FR        2806008        9/2001
KR   19940023912 A     11/1994
KR   20060019138 A      3/2006

OTHER PUBLICATIONS

Extended European Search Report issued in European Patent Application No. 13153515.5, dated Jun. 4, 2013.
(Continued)

*Primary Examiner* — Christopher P Jones
(74) *Attorney, Agent, or Firm* — Harness, Dickey & Pierce, P.L.C.

(57) ABSTRACT

An adsorbent for carbon dioxide may include a composite metal oxide including a divalent first metal ($M^1$), a trivalent second metal ($M^2$), and an element (A) with an electronegativity of about 2.0 to about 4.0. The composite metal oxide may have an amorphous structure. A method of manufacturing the adsorbent for carbon dioxide and a capture module for carbon dioxide including the adsorbent for carbon dioxide are also disclosed.

26 Claims, 4 Drawing Sheets (51) Int. Cl.
*B01J 20/08* (2006.01)
*B01J 20/30* (2006.01)
*B01J 20/02* (2006.01)

(52) U.S. Cl.
CPC ..... *B01D 2253/1124* (2013.01); *B01D 2253/25* (2013.01); *B01D 2257/504* (2013.01); *Y02C 10/08* (2013.01)

(56) References Cited

U.S. PATENT DOCUMENTS

| | | | |
|---|---|---|---|
| 6,284,021 | B1* | 9/2001 | Lu et al. .......................... 95/96 |
| 7,060,859 | B2 | 6/2006 | Figueras et al. |
| 2003/0166462 | A1 | 9/2003 | Figueras et al. |
| 2005/0250963 | A1 | 11/2005 | Figueras et al. |
| 2006/0144227 | A1 | 7/2006 | White et al. |
| 2008/0170978 | A1 | 7/2008 | Duan et al. |

OTHER PUBLICATIONS

Wang, et al., "High temperature adsorption of $CO_2$ on Mg—Al hydrotalcite: Effect of the charge compensating anions and the synthesis pH", Catalysis Today, vol. 164, Nov. 11, 2010, pp. 198-203.

Constantino, et al., "Basic Properties of $Mg^{2+}_{1-x}Al^{3+}_{x}$, Layered Double Hydroxides Intercalculated by Carbonate, Hydroxide, Chloride, and Sulfate Anions", Inorganic Chemistry, vol. 34, Feb. 1, 1995, pp. 883-892.

Kustrowski, et al., "Acidity and basicity of hydrotalcite derived mixed Mg—Al oxides studied by test reaction of MBOH conversion and temperature programmed desorption of $NH_3$ and $CO_2$,", Materials Research Bulletin, vol. 39, Feb. 2, 2004, pp. 263-281.

Reddy, et al., "Influence of Water on High-Temperature $CO_2$ Capture Using Layered Double Hydroxide Derivatives", Industrial & Engineering Chemistry Research, vol. 47, Mar. 13, 2008, pp. 2630-2635.

Leon, et al., "Adsorption of $CO_2$ on Hydrotalcite-Derived Mixed Oxides: Sorption Mechanisms and Consequences for Adsorption Irreversibility", Industrial & Engineering Chemistry Research, vol. 49, Apr. 21, 2010, pp. 3663-3671.

Reddy, et al., "Layered Double Hydroxides for $CO_2$ Capture: Structure Evolution and Regeneration", Industrial & Engineering Chemistry Research, vol. 45, Oct. 4, 2006, pp. 7504-7509.

DOE/NETL Carbon Dioxide Capture and Storage RD&D Roadmap (Dec. 2010) National Energy Technology Laboratory.

DOE/NETL 2007/1281 "Cost and Performance Baseline for Fossil Energy Plants" vol. 1: Bituminous Coal and Natural Gas to Electricity Final Report. May 2007. Revision August 20017.

* cited by examiner

ADSORBENT FOR CARBON DIOXIDE, METHOD OF PREPARING THE SAME, AND CAPTURE MODULE FOR CARBON DIOXIDE

CROSS-REFERENCE TO RELATED APPLICATION

This application claims priority under 35 U.S.C. §119 to Korean Patent Application Nos. 10-2012-0010987 and 10-2013-0004586, filed in the Korean Intellectual Property Office on Feb. 2, 2012 and Jan. 15, 2013, the entire contents of which are incorporated herein by reference.

BACKGROUND

1. Field

An adsorbent for carbon dioxide, a method of preparing the same, and a capture module for carbon dioxide including the same are disclosed.

2. Description of the Related Art

As fossil fuels are increasingly used, more carbon dioxide (which is known to have a serious influence on global warming of the earth) is emitted into the air. Accordingly, research has been undertaken on removal of carbon dioxide from flue gas generated when fossil fuels are combusted, syngas generated when a coal is gasificated, and fuel gas generated when natural gas is reformed.

The removal of carbon dioxide from flue gas may be performed in a wet chemical absorption method, a dry chemical absorption method, an adsorption method, a membrane separation method, and the like. However, in order to capture a relatively large amount of carbon dioxide from flue gas, an adsorbent having a relatively high adsorption performance is required.

In general, an adsorbent may be classified as an adsorbent for a low temperature (0° C. to room temperature) such as MOF (metal organic framework)/ZIF (zeolitic-imidazolate framework), zeolite, carbon, and the like, an adsorbent for a middle temperature (about 150 to about 400° C.) such as hydrotalcite and the like, and an adsorbent for a high temperature (greater than or equal to about 500° C.). These adsorbents have problems of complexity of process and additional costs, since flue gas discharged after combustion should be cooled or heated. Accordingly, development of an adsorbent having a relatively high adsorption performance at a temperature ranging from about 150 to about 400° C. at which carbon dioxide is adsorbed from flue gas is required.

SUMMARY

Various embodiments relate to an adsorbent for carbon dioxide, which has a relatively high adsorption performance and thermal stability and works at a relatively high temperature.

Various embodiments relate to a method of manufacturing the adsorbent for carbon dioxide, and a capture module for carbon dioxide including the same.

An adsorbent for carbon dioxide may include a composite metal oxide including a divalent first metal ($M^1$), a trivalent second metal ($M^2$), and an element (A) with an electronegativity ranging from about 2.0 to about 4.0. The composite metal oxide may have an amorphous structure.

The composite metal oxide may be represented by the following Chemical Formula 1.

$$[M^1_{1-x}M^2_xA_y]O_a \qquad \text{[Chemical Formula 1]}$$

In Chemical Formula 1, $M^1$ is a divalent first metal, $M^2$ is a trivalent second metal, A is an element having an electronegativity of about 2.0 to about 4.0, x is in a range of 0.2 to 0.4, y is in a range of 0.3 to 3, and a is a number required for making a charge balance of oxygen with $M^1$, $M^2$, and A.

The divalent first metal $M^1$ may be selected from an alkaline-earth metal, a transition metal, and a combination thereof, and specifically, from magnesium (Mg), calcium (Ca), strontium (Sr), nickel (Ni), manganese (Mn), iron (Fe), cobalt (Co), copper (Cu), zinc (Zn), beryllium (Be), and a combination thereof. The trivalent second metal ($M^2$) may be selected from an element belonging to Group 13 in the IUPAC periodic table, a transition metal, a lanthanide, and a combination thereof, and specifically, from aluminum (Al), chromium (Cr), manganese (Mn), iron (Fe), cobalt (Co), lanthanum (La), cerium (Ce), gallium (Ga), indium (In), vanadium (V), and a combination thereof.

The mole ratio ($M^1/M^2$) of the first metal $M^1$ and the second metal $M^2$ in the composite metal oxide may be in a range of about 1.5/1 to about 4/1.

The element (A) with an electronegativity of about 2.0 to about 4.0 may be selected from phosphorus (P), boron (B), fluorine (F), sulfur (S), chlorine (Cl), and a combination thereof. The element (A) may specifically have an electronegativity ranging from about 2.2 to 4.0, and more specifically, from about 3.0 to about 4.0.

The adsorbent for carbon dioxide may further include at least either of an alkali metal or an oxide of the alkali metal on the surface of the composite metal oxide.

According to another non-limiting embodiment, a method of manufacturing an adsorbent for carbon dioxide including a composite metal oxide, which includes a divalent first metal ($M^1$), a trivalent second metal ($M^2$), and an element (A) with an electronegativity ranging from about 2.0 to about 4.0 and has an amorphous structure, may include preparing a mixed aqueous solution by dissolving a salt of a divalent first metal and a salt of a trivalent second metal in water; adjusting pH of the mixed aqueous solution to be basic to precipate a composite metal hydroxide; separating the composite metal hydroxide; mixing the composite metal hydroxide with an aqueous solution of a salt including an element having an electronegativity of about 2.0 to about 4.0 to obtain a mixture; adjusting pH of the mixture to be equal to or less than about 7 and stirring the mixture to prepare an ion-exchanged composite metal hydroxide; separating the ion-exchange composite metal hydroxide from the mixture; and calcining the ion-exchanged composite metal hydroxide to obtain a composite metal oxide, and in the method, the salts of the divalent first metal and of the trivalent second metal do not include a carbonate anion.

The salt of a divalent metal may be selected from nitrates, acetates, and hydrates thereof which include a first metal selected from an alkaline-earth metal, a transition metal, and a combination thereof, and specifically, a first metal selected from magnesium (Mg), calcium (Ca), strontium (Sr), nickel (Ni), manganese (Mn), iron (Fe), cobalt (Co), copper (Cu), zinc (Zn), beryllium (Be), and a combination thereof. The salt of a divalent metal and the salt of a trivalent metal do not include a carbonate anion.

The salt of a trivalent metal may be selected from nitrates, acetates, and hydrates thereof which include a second metal selected from an element belonging to Group 13 in the IUPAC periodic table, a transition metal, a lanthanide, and a combination thereof, and for example, a second metal selected form aluminum (Al), chromium (Cr), manganese (Mn), iron (Fe), cobalt (Co), lanthanum (La), cerium (Ce), gallium (Ga), indium (In), vanadium (V), and a combination thereof.

The pH of the mixed aqueous solution may be adjusted in a range of about 9 to about 12.

The method may further include aging the composite metal hydroxide with stirring it at a temperature of 60° C. or lower.

The method may further include drying the composite metal hydroxide at a temperature of 60° C. or lower under a pressure of atmospheric pressure (1.013 bar) or lower.

The ion-exchanged composite metal hydroxide may be represented by the following Chemical Formula 2:

[Chemical Formula 2]

In Chemical Formula 2, $M^1$ is a divalent first metal, $M^2$ is a trivalent second metal, $A^1$ is an anion of a salt of the divalent first metal, $A^2$ is an anion of a salt of the trivalent second metal, $A^3$ is an anion of a salt including an element having an electronegativity of about 2.0 to about 4.0, each of x, y, and z is in a range of about 0.2 to about 0.4, y+z is less than 1, n is determined depending on the valences of the anion ($A^3$) and the anions ($A^1$ and $A^2$) of the metal salts, and m is in a range of about 0 to about 8.

The anion of the salt of the divalent first metal ($A^2$) and the anion of the salt of the trivalent second metal ($A^3$) may be independently selected from a nitrate ion ($NO_3^-$), an acetate ion ($CH_3COO^-$), and a combination thereof.

The anion of the salt including an element having an electronegativity of about 2.0 to about 4.0 may be selected from a phosphate ion ($PO_4^{3-}$), a borate ion ($BO_3^{3-}$), a sulfate ion ($SO_4^{2-}$), a peroxosulfate ion ($S_2O_8^{2-}$), a chloride ion ($Cl^-$) a chlorate ion ($ClO_4^-$), a fluoride ion ($F^-$), and a combination thereof.

The salt including an element having an electronegativity of about 2.0 to about 4.0 may include a cation selected from $K^+$, $Ca^{2+}$, $NH_4^+$, $Na^+$, and a combination thereof.

The salt including an element having an electronegativity of about 2.0 to about 4.0 may be selected from $KH_2PO_4$, $K_2HPO_4$, $CaHPO_4$, $(NH_4)H_2PO_4$, $(NH_4)_2HPO_4$, $NaH_2PO_4$, $Na_2HPO_4$, $KH_2BO_3$, $K_2HBO_3$, $CaHBO_3$, $(NH_4)H_2BO_3$, $(NH_4)_2HBO_3$, $NaH_2BO_3$, $Na_2HBO_3$, $K_2SO_4$, $KHSO_4$, $CaSO_4$, $(NH_4)_2SO_4$, $(NH_4)HSO_4$, $Na_2SO_4$, $NaHSO_4$, $K_2S_2O_8$, $(NH_4)_2S_2O_8$, $Na_2S_2O_8$, $KCl$, $CaCl_2$, $NH_4Cl$, $NaCl$, $KClO_4$, $NH_4ClO_4$, $NaClO_4$, $KF$, $KHF_2$, $CaF_2$, $NH_4F$, $NH_4HF_2$, $NaF$, $NaHF_2$, and a combination thereof.

The pH of the mixture may be adjusted in a range of about 3 to about 6.

The calcining may be performed at a temperature of about 200° C. to about 700° C.

Another non-limiting embodiment relates to a capture module for carbon dioxide including the adsorbent for carbon dioxide.

DETAILED DESCRIPTION

This disclosure will be described more fully hereinafter in the following detailed description, in which various example embodiments of this disclosure are described. This disclosure may be embodied in many different forms and is not be construed as limited to the embodiments set forth herein.

As used herein, the term "combination thereof" may refer to a mixture, a stacked structure, a composite compound, a reaction product, an alloy, and the like.

According to a non-limiting embodiment, an adsorbent for carbon dioxide may include a composite metal oxide including a divalent first metal ($M^1$), a trivalent second metal ($M^2$), and an element (A) with an electronegativity of about 2.0 to about 4.0. The composite metal oxide may be an amorphous composite metal oxide.

The composite metal oxide may be represented by the following Chemical Formula 1.

[Chemical Formula 1]

In Chemical Formula 1, $M^1$ is a divalent first metal, $M^2$ is a trivalent second metal, A is an element having an electronegativity of about 2.0 to about 4.0, x is in a range of 0.2 to 0.4, y is in a range of 0.3 to 3, and a is a number required for making a charge balance of oxygen with $M^1$, $M^2$, and A. For example, a may range from 2.5 to 6.

The composite metal oxide is a calcined product of a composite metal hydroxide including a divalent first metal ($M^1$), a trivalent second metal ($M^2$), and an element (A) with an electronegativity of about 2.0 to about 4.0 but not including a carbonate anion.

The divalent first metal ($M^1$) may be selected from an alkaline-earth metal, a transition metal, and a combination thereof, for example, from magnesium (Mg), calcium (Ca), strontium (Sr), nickel (Ni), manganese (Mn), iron (Fe), cobalt (Co), copper (Cu), zinc (Zn), beryllium (Be), and a combination thereof.

The trivalent second metal ($M^2$) may be selected from an element belonging to Group 13 in the IUPAC periodic table, a transition metal, a lanthanide, and a combination thereof, for example, aluminum (Al), chromium (Cr), manganese (Mn), iron (Fe), cobalt (Co), lanthanum (La), cerium (Ce), gallium (Ga), indium (In), vanadium (V), and a combination thereof. The trivalent second metal $M^2$ may play a role in providing a passage for facilitating charge transfer to the first metal.

The first metal ($M^1$) may be different from the second metal ($M^2$).

In the composite metal oxide, the first metal ($M^1$) and the second metal ($M^2$) may be included in a $M^1/M^2$ mole ratio range of about 1.5/1 to about 4/1. Without being bound by any theory, when the first metal is included in a higher mole ratio than the second metal, an adsorbent for carbon dioxide may show a higher level of basicity resulting from the first metal and thus the adsorbent may have a higher level of adsorption capacity for an acidic gas ($CO_2$ and the like).

The element (A) with an electronegativity of about 2.0 to about 4.0 may be selected from phosphorus (P), boron (B), fluorine (F), sulfur (S), chlorine (Cl), and a combination thereof. When the element (A) is included in a composite metal oxide, it may increase the polarity of the surface of the composite metal oxide and thereby improve adsorption performance of carbon dioxide.

The element (A) may have an electronegativity ranging from about 2.2 to about 4.0, and specifically, from about 3.0 to about 4.0. The element (A) having an electronegativity within the above range may impart sufficient polarity to the composite metal oxide.

The element (A) having an electronegativity of about 2.0 to about 4.0 may be included in an amount of about 0.3 moles to about 3 moles, specifically, about 0.5 moles to about 2.5 moles, based on one mole of a metal (the sum of a divalent first metal $M^1$ and a trivalent second metal $M^2$). When the element (A) is included within the aforementioned range, the composite metal oxide may have sufficient polarity.

The composite metal oxide has an amorphous structure, which shows a broad peak in XRD spectrum. The composite metal oxide having an amorphous structure may have a larger specific surface area, for example, from about 20 $m^2/g$ to about 100 $m^2/g$, and this makes it possible for the composite metal oxide to show enhanced adsorption performance of carbon dioxide.

The adsorbent for carbon dioxide may further include at least either one selected from an alkali metal or an oxide of the alkali metal on the surface of the composite metal oxide. The alkali metal or the alkali metal oxide may be included in an amount of about 1 to about 10 parts by weight based on 100 parts by weight of the composite metal oxide. When the alkali metal or the alkali metal oxide is included within the aforementioned range, it may enhance the basicity of the adsorbent for carbon dioxide, thereby improving the adsorption performance of carbon dioxide.

According to another non-limiting embodiment, a method of manufacturing an adsorbent for carbon dioxide including a composite metal oxide, which includes a divalent first metal ($M^1$), a trivalent second metal ($M^2$), and an element (A) with an electronegativity ranging from about 2.0 to about 4.0 and has an amorphous structure, may include preparing a mixed aqueous solution by dissolving a salt of a divalent first metal and a salt of a trivalent second metal in water; adjusting pH of the mixed aqueous solution to be basic to precipitate a composite metal hydroxide; separating the composite metal hydroxide; mixing the composite metal hydroxide with an aqueous solution of a salt including an element with an electronegativity of about 2.0 to about 4.0 to obtain a mixture; adjusting pH of the mixture to be equal to or less than about 7 and stirring the mixture to prepare an ion-exchanged composite metal hydroxide; separating the ion-exchanged composite metal hydroxide; and calcining the ion-exchanged composite metal hydroxide to obtain a composite metal oxide, wherein the salts of the divalent first metal and the trivalent second metal do not include a carbonate anion.

The salt of a divalent metal may be nitrates, acetates, and hydrates thereof, which include a first metal ($M^1$) selected from magnesium (Mg), calcium (Ca), strontium (Sr), nickel (Ni), manganese (Mn), iron (Fe), cobalt (Co), copper (Cu), zinc (Zn), beryllium (Be), and a combination thereof.

The salt of the trivalent metal may be nitrates, acetates, and hydrates thereof, which include a second metal ($M^2$) selected from aluminum (Al), chromium (Cr), manganese (Mn), iron (Fe), cobalt (Co), lanthanum (La), cerium (Ce), gallium (Ga), indium (In), vanadium (V), and a combination thereof.

In non-limiting examples, the mixed aqueous solution does not substantially include a carbonate anion. For example, the water being used in the preparation of the mixed aqueous solution may be decarbonated water that does not include dissolved carbon dioxide.

The pH of the mixed aqueous solution may be adjusted to be in a range of about 9 to about 12. An inorganic base may be utilized, for example in the form of an aqueous solution, so as to adjust the pH of the mixed aqueous solution to be basic. Specific examples of the inorganic base include alkali metal hydroxide such as sodium hydroxide, potassium hydroxide, and lithium hydroxide; alkaline earth metal hydroxide such as calcium hydroxide and barium hydroxide; ammonium hydroxide; ammonia water; and the combination thereof, but it is not limited thereto. When the pH of the mixed aqueous solution is adjusted to be basic, a composite metal hydroxide is precipitated therefrom.

The composite metal hydroxide may be aged by stirring it at a temperature of 100° C. or lower, specifically at a temperature of 15° C. to 60° C., more specifically at a temperature of 20° C. to 55° C. A time period for aging is not particularly limited and it can be selected properly. By way of an example, the aging may be carried out for 12 hours or longer.

The composite metal hydroxide is separated from the aqueous solution. The separation may be carried out in any suitable manner, for example through centrifugation, filtering, or the like. The composite metal hydroxide as separated may be subjected to drying at a temperature of about 80° C. or lower, specifically about 60° C. or lower, more specifically about 40° c. or lower, even more specifically about 35° C. or lower under a pressure of atmospheric pressure (about 1.013 bar) or lower. By way of an example, the composite metal hydroxide as separated may be dried at a temperature of about 35° C. under a reduced pressure (for example, in a vacuum oven). In another examples, the separated composite metal hydroxide may be subjected to freeze-drying at a low temperature of about 0° c. or lower, specifically about −10° C. or lower, more specifically about −20° C. or lower, by way of an example, at a very low temperature of 77 Kelvin (K) or lower by using liquid nitrogen. In case of freeze drying, the surface area of the composite metal hydroxide may increase, and thereby the carbon dioxide adsorption capacity of the resulting adsorbent may be further enhanced.

The composite metal hydroxide is mixed with an aqueous solution of a salt including an element having an electronegativity of about 2.0 to about 4.0 to produce a mixture. The pH of the mixture is adjusted to be about 7 or less, while the mixture is stirred. In this way, the composite metal hydroxide may include an anion ($A^3$) including an element with an electronegativity ranging from about 2.0 to about 4.0, which is ion-exchanged with a part of the anion of a salt including the divalent first metal ($A^1$) and the anion of a salt including the trivalent second metal ($A^2$), to form an ion-exchanged composite metal hydroxide.

The ion-exchanged composite metal hydroxide may be represented by the following Chemical Formula 2.

$$[M^1{}_{1-x}M^2{}_x(OH)_2]^{x+}[((A^1)_y(A^2)_z(A^3)_{1-y-z})^{n-}{}_{x/n}]^{x-} \cdot mH_2O$$ [Chemical Formula 2]

In Chemical Formula 2, $M^1$ is a divalent first metal, $M^2$ is a trivalent second metal, $A^1$ is an anion of a salt of the divalent first metal, $A^2$ is an anion of a salt of the trivalent second metal, $A^3$ is an anion including an element having an electronegativity of about 2.0 to about 4.0, each of x, y, and z is in a range of about 0.2 to about 0.4, y+z is less than 1, n is determined according to valences of the anion ($A^3$) and anions of the metal salts ($A^1$ and $A^2$), and m is in a range of about 0 to about 8.

The anion of a salt of the divalent first metal ($A^1$) and the anion of a salt of the trivalent second metal ($A^2$) may be independently selected from a nitrate ion ($NO_3^-$), an acetate ion ($CH_3COO^-$), and a combination thereof.

The anion ($A^3$) of a salt including an element having an electronegativity of about 2.0 to about 4.0 may be selected from a phosphate ion ($PO_4^{3-}$), a borate ion ($BO_3^{3-}$), a sulfate ion ($SO_4^{2-}$), a peroxosulfate ion ($S_2O_8^{2-}$), a chloride ion ($Cl^-$), a chlorate ion ($ClO_4^-$), a fluoride ion ($F^-$), and a combination thereof.

The salt including an element having an electronegativity of about 2.0 to about 4.0 may include a cation selected from $K^+$, $Ca^{2+}$, $NH_4^+$, $Na^+$, and a combination thereof.

Specifically, the salt including an element having an electronegativity of about 2.0 to about 4.0 may be selected from $KH_2PO_4$, $K_2HPO_4$, $CaHPO_4$, $(NH_4)H_2PO_4$, $(NH_4)_2HPO_4$, $NaH_2PO_4$, $Na_2HPO_4$, $KH_2BO_3$, $K_2HBO_3$, $CaHBO_3$, $(NH_4)H_2BO_3$, $(NH_4)_2HBO_3$, $NaH_2BO_3$, $Na_2HBO_3$, $K_2SO_4$, $KHSO_4$, $CaSO_4$, $(NH_4)_2SO_4$, $(NH_4)HSO_4$, $Na_2SO_4$, $NaHSO_4$, $K_2S_2O_8$, $(NH_4)_2S_2O_8$, $Na_2S_2O_8$, $KCl$, $CaCl_2$, $NH_4Cl$, $NaCl$, $KClO_4$, $NH_4ClO_4$, $NaClO_4$, $KF$, $KHF_2$, $CaF_2$, $NH_4F$, $NH_4HF_2$, $NaF$, $NaHF_2$, and a combination thereof.

According to non-limiting embodiments, the salts of a divalent first metal and of a trivalent second metal include substantially no carbonate ion as their anions ($A^2$ and $A^3$). Therefore, unlike hydrotalcite typically known as a layered structure material, the composite metal hydroxide does not include the carbonate anion ($CO_3^{-2}$). As a result, the ion-exchange may easily occur between the composite metal hydroxide and the salt including an element with an electronegativity of about 2.0 to about 4.0 because a nitrate ion ($NO_3^-$), an acetate ion ($CH_3COO^-$), and the like included in the salt of a divalent first metal and the salt of a trivalent second metal may be easily ion-exchanged with an anion including an element having an electronegativity of about 2.0 to about 4.0.

For facilitating ion-exchange, the pH of the mixture of the composite metal hydroxide and the aqueous solution of the salt including an element having an electronegativity of about 2.0 to about 4.0 is adjusted to be in an acidic range, specifically, equal to or less than about 7, for example, in a range of about 3 to about 6. A weak acid may be used in order to adjust the pH of the mixture. Specific examples of the weak acid may include acetic acid, formic acid, phosphoric acid, oxalic acid, and any salt thereof, but it is not limited thereto. When a salt that can form an acidic aqueous solution such as $KH_2PO_4$ is used as the salt including an element having an electronegativity of about 2.0 to about 4.0, adjusting the pH of the mixture in the aforementioned range may be made without using an additional acidic compound such as the weak acid.

The ion-exchanged composite metal hydroxide is separated from the mixture. After being separated, the ion-exchanged composite metal hydroxide may be optionally subjected to washing with water, and to drying at a temperature of about 80° C. or lower, specifically about 60° C. or lower, more specifically about 40° C. or lower, under a pressure of atmospheric pressure or lower. By way of an example, the ion-exchanged composite metal hydroxide as separated may be dried at a temperature of about 35° C. or lower under reduced pressure (e.g., in a vacuum oven). In other examples, the ion-exchanged composite metal hydroxide as separated may be dried (e.g., freeze-dried) at a low temperature of about 0° C. or lower, specifically, about −10° C. or lower, more specifically about −20° C. or lower, for example at a very low temperature of 77 Kelvin (K) or lower with using liquid nitrogen.

After the optional washing and drying, the ion-exchanged composite metal hydroxide is calcined to become a composite metal oxide. The calcining may be performed at a temperature of about 200° C. to about 700° C., in particular, about 300° C. to about 500° C., and in more particular, about 400° C. to about 500° C. The calcining may be performed in air or in an oxygen-containing atmosphere. The calcining time is not particularly limited and the calcining may be performed for a time period ranging from about one hour to about 20 hours. Through such calcining, it is possible to obtain a composite metal oxide having an amorphous structure and showing excellent level of carbon dioxide adsorption capacity.

According to another non-limiting embodiment, a capture module for carbon dioxide, which includes the adsorbent for carbon dioxide, is provided. The adsorbent for carbon dioxide may be filled in a column and the like, but it is not particularly limited.

Hereinafter, various embodiments are illustrated in more detail with reference to the following examples. However, the following embodiments are merely examples and are not limiting.

EXAMPLES

Preparation of Composite Metal Oxide

Example 1

Aluminum nitrate ($Al(NO_3)_3 \cdot 9H_2O$) and magnesium nitrate ($Mg(NO_3)_2 \cdot 6H_2O$) as precursors are mixed with 200 ml of water, preparing an aqueous mixed solution. Each precursor is used in such an amount that the mole ratio between two metals (i.e., Mg and Al) become 3:1. NaOH is dissolved in water, preparing 100 ml of a 1 M NaOH aqueous solution. The NaOH aqueous solution is added to the aqueous mixed solution with stirring and then a composite metal hydroxide of Mg and Al is precipitated therefrom. During the precipitation of the composite metal hydroxide, the pH is set to be in a range of about 9.5 to about 10.5. The composite metal hydroxide as obtained is aged with vigorous stirring at room temperature (25° C.) for 24 hours. Then, the precipitates are separated with using centrifugation (8000 RPM, 10 minutes) and washed with water. This procedure is repeated at least three times. Then, the composite metal hydroxide as separated is dried at room temperature (25° C.) in a vacuum oven to provide a composite metal hydroxide powder. 1 g of the composite metal hydroxide powder is mixed with 200 ml of a 0.1 M $KH_2PO_4$ aqueous solution, and the resulting mixture is vigorously stirred for 24 hours to conduct ion exchange, and thereby an ion-exchanged composite metal hydroxide is obtained. During the ion-exchange, the pH of the mixture is 4.5. The ion-exchanged composite metal hydroxide is separated by filtering, washed, and then dried at room temperature (25° C.) in a vacuum oven. The dried powder is calcined at 400° C. for 5 hours in the air, preparing a composite metal oxide. Water as used in this example is decarbonated and distilled water from which $CO_2$ is removed by bubbling nitrogen into the flask.

Example 2

A composite metal oxide is obtained in the same manner as set forth in Example 1, except that after the washing, the composite metal hydroxide is separated and freeze-dried under a pressure of 0.1 bar at a temperature of 77 Kelvin (K) with using liquid nitrogen to obtain a composite metal hydroxide powder.

Comparative Example 1

Preparation of Composite Metal Oxide

Aluminum nitrate ($Al(NO_3)_3 \cdot 9H_2O$) and magnesium nitrate ($Mg(NO_3)_2 \cdot 6H_2O$) as precursors are mixed with 200 ml of water, preparing an aqueous mixed solution. Each precursor is used in such an amount that the mole ratio between two metals (i.e., Mg and Al) is 3:1. NaOH is dissolved in water to prepare 100 ml of a 1 M NaOH aqueous solution. The NaOH aqueous solution is added to the aqueous mixed solution with stirring and then a composite metal hydroxide of Mg and Al is precipitated therefrom. During the precipitation of the composite metal hydroxide, the pH is set to be in a range of about 9.5 to about 10.5. The composite metal hydroxide as obtained is aged with vigorous stirring at room temperature (25° C.) for 24 hours. Then, the precipitate is separated with using centrifugation (8000 RPM, 10 minutes) and washed with water. This procedure is repeated at least three times. Then, the composite metal hydroxide as separated is freeze-dried under a pressure of 0.1 bar at a temperature of 77 Kelvin (K) with using liquid nitrogen to provide a composite metal hydroxide powder. The dried powder is calcined at 400° C. for 5 hours in air, preparing a composite metal oxide. The water as used in this example is decarbonated and distilled water from which $CO_2$ is removed by bubbling nitrogen into the flask.

Comparative Example 2

$Mg_4Al_2(OH)_{12}(CO_3).4H_2O$, the composite metal hydroxide including a carbonate salt, is calcined for 5 hours in the air, preparing a composite metal oxide.

Comparative Example 3

Aluminum nitrate $(Al(NO_3)_3.9H_2O)$ and magnesium nitrate $(Mg(NO_3)_2.6H_2O)$ as precursors are mixed with 200 ml of water, preparing an aqueous mixed solution. Herein, each precursor is used in such an amount that the mole ratio between two metals (i.e., Mg and Al) is 3:1. NaOH is dissolved in water, preparing 100 ml of a 1 M NaOH aqueous solution. The NaOH aqueous solution is added to the aqueous mixed solution with stirring and then a composite metal hydroxide of Mg and Al is precipitated therefrom. During the precipitation of the composite metal hydroxide, the pH is set to be in a range of about 9.5 to about 10.5. The composite metal hydroxide as obtained is aged with vigorous stirring at room temperature (25° C.) for 24 hours. Then, the precipitate is separated with using centrifugation (8000 RPM, 10 minutes) and washed with water. This procedure is repeated at least three times. Then, the composite metal hydroxide as separated is freeze-dried under a pressure of 0.1 bar at a temperature of 77 Kelvin (K) to provide a composite metal hydroxide powder. 1 g of the composite metal hydroxide powder is mixed with 200 ml of a 0.1 M $K_2HPO_4$ aqueous solution, and the resulting mixture is vigorously stirred for 24 hours to conduct ion exchange, and thereby an ion-exchanged composite metal hydroxide is obtained. During the ion-exchange, the pH of the mixture is 9.1. The ion-exchanged composite metal hydroxide is separated by filtering, washed, and then dried at room temperature (25° C.) in a vacuum oven. The dried powder is calcined at 400° C. for 5 hours in air, preparing a composite metal oxide. Herein, the water as used in this example is decarbonated and distilled water from which $CO_2$ is removed by bubbling nitrogen into the flask.

[Characterization of Composite Metal Hydroxide]

Crystallinity Analysis

Figure 1:
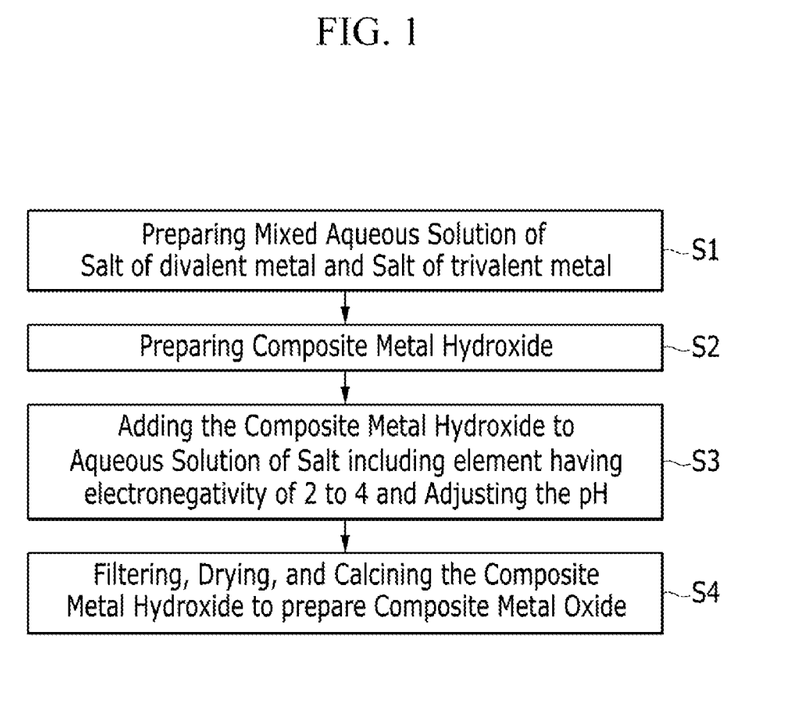
FIG. 1 is a flow chart showing a method or process of manufacturing an adsorbent for carbon dioxide according to a non-limiting example embodiment.
Figure 2:
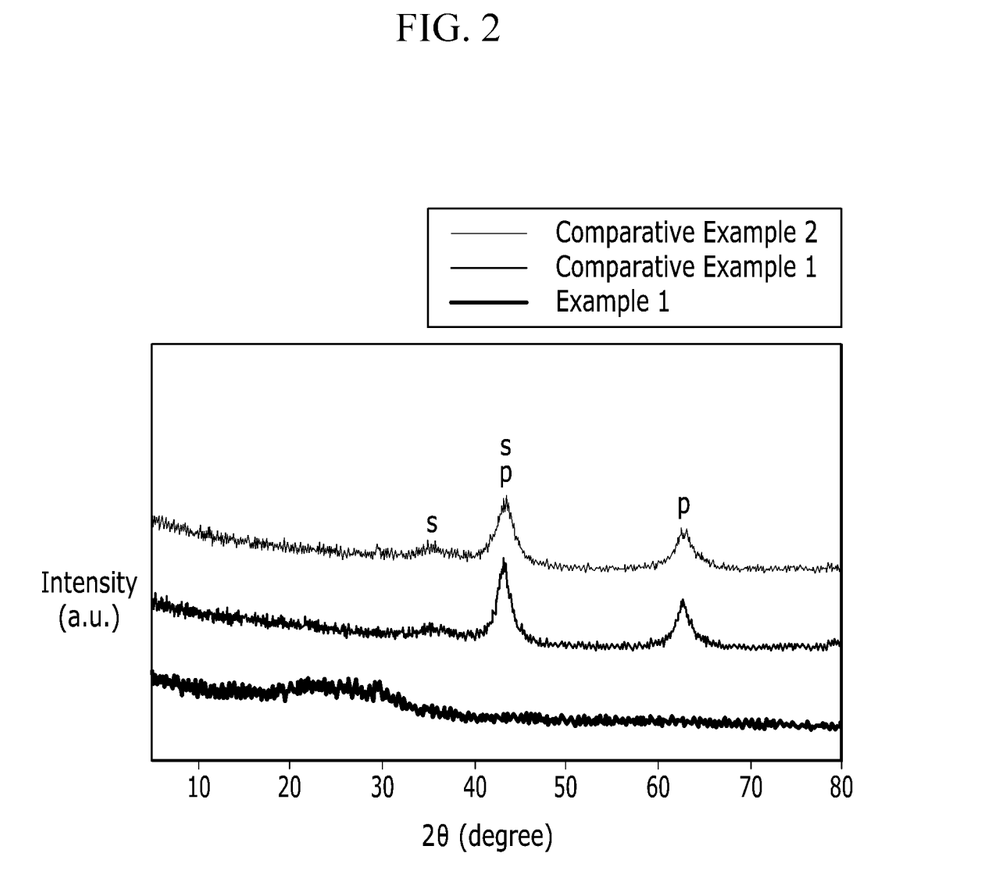
FIG. 2 is a drawing showing X-ray diffraction (XRD) analysis results of the composite metal oxides prepared from Example 1 and Comparative Examples 1 and 2.
Figure 3:
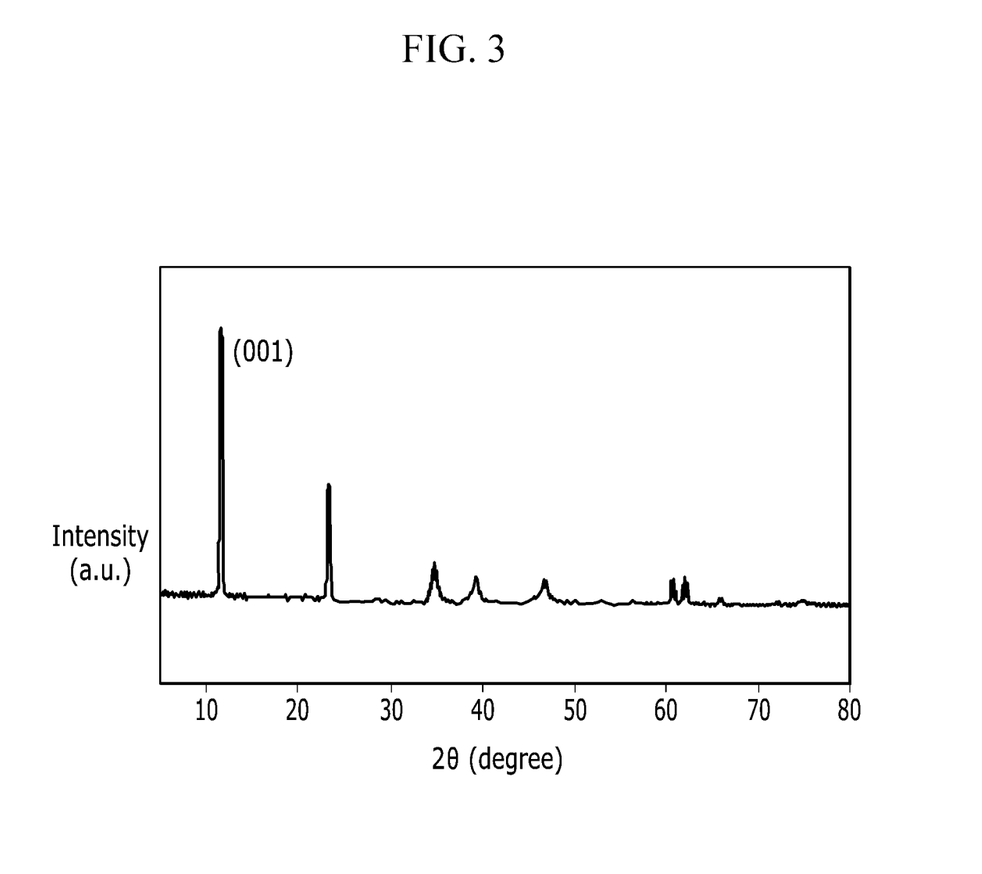
FIG. 3 is a drawing showing X-ray diffraction (XRD) analysis results of $Mg_4Al_2(OH)_{12}(CO_3) \cdot 4H_2O$ used in Comparative Example 2.

X-ray diffraction (XRD) analysis is made for the composite metal oxides prepared in Examples 1 and 2 and Comparative Examples 1 to 3. The X-ray diffraction analysis is performed with using a Cu Kα ray operated at 40 kV and 40 mA at a scan speed of 0.2° per second (Philips X'pert X-ray diffractometer). The results confirm that the composite metal oxides of Example 1 and Example 2 are amorphous, while those of Comparative Examples 1 to 3 are crystalline. By way of an example, FIG. 2 shows the view illustrating XRD analysis results for the composite metal hydroxides of Example 1 and Comparative Examples 1 and 2. As can be shown in FIG. 2, the composite metal oxide of Example 1 has an amorphous structure, while XRD spectrum of the composite metal oxides of Comparative Examples 1 and 2 have peaks for a MgO crystalline phase (denoted as "s" in FIG. 2) and a $MgAl_2O_4$ crystalline phase (denoted as "p" in FIG. 2). FIG. 3 shows X-ray diffraction (XRD) spectrum of $Mg_4Al_2(OH)_{12}(CO_3).4H_2O$, which is used in Comparative Example 2. The crystalline peak of $Mg_4Al_2(OH)_{12}(CO_3).4H_2O$ as shown in FIG. 3 is also observed in the XRD spectrum of the composite metal oxide of Comparative Example 2, and such results suggest the crystalline structure of $Mg_4Al_2(OH)_{12}(CO_3).4H_2O$ remains without being destroyed even after calcination.

Measurement of Specific Surface Area

Specific surface areas are measured for the composite metal oxide of Examples 1 and 2 and Comparative Examples 1 to 3 by conducting nitrogen adsorption/desorption isothermal reaction with using Bell SorpMax instrument (manufactured from Bell Japan Co. Ltd.).

Measurement of the Amount of Metals and Phosphorous in the Composite Metal Oxide For each of the composite metal oxides of Examples 1 and 2 and Comparative Examples 1 to 3, 1 ml of HCl, 0.1 ml of nitric acid, and 10 ml of deionized water are added to 20 mg of the composite metal oxide to prepare a solution. 1 ml of the resulting solution is taken and put into a 10 ml tube (or flask) and diluted 10 times with 2% HCl to obtain a sample solution. With using the sample solution and Inductively coupled plasma atomic emission spectroscopy (ICP-AES), the amounts of Mg, Al, and P in the composite metal oxide are determined, respectively. The results are compiled in Table 1.

TABLE 1

|  | Mg (wt. %) | Al (wt. %) | Mg/Al (atom ratio) | P (wt. %) | BET Surface Area (m²/g) |
|---|---|---|---|---|---|
| Example 1 | 25.0 | 9.8 | 2.83 | 15.9 | 34 |
| Example 2 | 15.4 | 7.8 | 2.20 | 22.1 | 73 |
| Comparative Example 1 | 34.4 | 13.9 | 2.75 | — | 210 |
| Comparative Example 2 | 31.9 | 12.4 | 2.86 | — | 42 |
| Comparative Example 3 | 29.6 | 12.1 | 2.72 | 6.3 | 61 |

The results of Table 1 confirm that in Example 1, Example 2, and Comparative Example 3, the composite metal oxides as formed include P together with Mg and Al.

[Carbon Dioxide Adsorption Experiments with Using the Composite Metal Oxides]

Tests for $CO_2$ Adsorption Capacity 0.25 g of each of the composite metal oxides obtained from Examples 1 and 2 and Comparative Examples 1 to 3 is filled in a quartz column, respectively. A post-combustion gas mixture including 10 volume % of $CO_2$ and 90 volume % of $N_2$ and a pre-combustion gas mixture including 40 volume % of $CO_2$ and 60 volume % of $H_2$ are made to flow through the quartz column at a speed of about 200 ml/min at a temperature of 200° C. under a pressure of 1 bar. From the results of the adsorption test as described above, $CO_2$ adsorption capacity of the composite metal oxides of Examples 1 and 2 and Comparative Examples 1 to 3 are calculated and compiled in Table 2. The adsorption capacity is calculated by the following equation:

Adsorption Capacity (mmol/g or wt %)=The amount (mmol or g) of adsorbed $CO_2$/the weight (g) of the adsorbent In the following Table 2, "Total $CO_2$ Adsorption Capacity" refers to the total amount of adsorbed $CO_2$ per a gram of the adsorbent during the $CO_2$ adsorption experiment. "90% BT Adsorption Capacity" (i.e., 90% Breakthrough adsorption capacity) refers to the total amount of $CO_2$ being adsorbed per a gram of the adsorbent, until when $CO_2$ is not adsorbed any more and 10% of the initial $CO_2$ amount is detected in the breakthrough curve.

TABLE 2

| | | Example 1 | Example 2 | Comparative Example 1 | Comparative Example 2 | Comparative Example 3 |
|---|---|---|---|---|---|---|
| $10CO_2/$ $90N_2$ | Total $CO_2$ Adsorption Capacity (mmol/g) | 2.57 (11.3 wt. %) | 3.07 (13.51 wt. %) | 1.07 (4.71 wt. %) | 1.08 (4.75 wt. %) | 1.24 (5.46 wt. %) |
| | BT 90% Adsorption Capacity (mmol/g) | 2.36 (10.38 wt. %) | 2.73 (12.01 wt. %) | 0.81 (3.56 wt. %) | 0.77 (3.39 wt. %) | 1.01 (4.44 wt. %) |
| $40CO_2/$ $60H_2$ | Total $CO_2$ Adsorption Capacity (mmol/g) | 5.18 (22.79 wt. %) | 7.00 (30.8 wt. %) | 3.41 (15.0 wt. %) | 3.30 (14.52 wt. %) | 3.59 (15.80 wt. %) |
| | BT 90% Adsorption Capacity (mmol/g) | 4.30 (18.92 wt. %) | 5.82 (25.61 wt. %) | 2.91 (12.80 wt. %) | 2.70 (11.88 wt. %) | 3.07 (13.51 wt. %) |

The results as shown in Table 2 confirm that the composite metal oxides of Examples 1 and 2 have a superior level of $CO_2$ adsorption capacity to the composite metal oxides of Comparative Examples 1 to 3.

Evaluation of Adsorption Capacity Depending on the Temperature

The composite metal oxide of Example 2 is filled in a quartz column and then is subjected to a $CO_2$ adsorption test under the following conditions at different temperatures of 200° C., 300° C., 400° C., and 500° C., respectively:

Composition of inlet gas stream: 40% $CO_2$+60% $H_2$ total flow rate: 200 ml/min weight of the composite metal oxide as filled in the column: 0.25 g pressure: 1 bar The breakthrough curves obtained from the tests are used to calculate a total $CO_2$ adsorption capacity and 90% BT adsorption capacity. The results are compiled in Table 3.

TABLE 3

| Temperature | Total $CO_2$ Adsorption Capacity (mmol/g) | 90% BT Adsorption Capacity (mmol/g) |
|---|---|---|
| 200° C. | 7.00 (30.8 wt. %) | 5.82 (25.6 wt. %) |
| 300° C. | 7.82 (34.4 wt. %) | 6.70 (29.5 wt. %) |
| 400° C. | 9.30 (40.9 wt. %) | 7.91 (34.8 wt. %) |
| 500° C. | 6.11 (26.9 wt. %) | 4.77 (21.0 wt. %) |

The results as set forth in Table 3 confirm that the composite metal oxide of Example 2 has a high level of adsorption capacity at a temperature of 200° C. to 500° C.

Durability Tests for the Composite Metal Oxide (Isothermal Cycle Test)

Each of the composite metal oxides of Example 2 and Comparative Example 2 is filled in a quartz column, respectively, and then is subjected to a $CO_2$ adsorption performance test (isothermal regeneration test) for 100 cycles under the following conditions to observe the changes in the $CO_2$ adsorption capacity:

Composition of inlet gas stream: 40% $CO_2$+60% $H_2$ total flow rate: 200 ml/min weight of the composite metal oxide as filled in the column: 0.25 g pressure: 1 bar.

Figure 4:
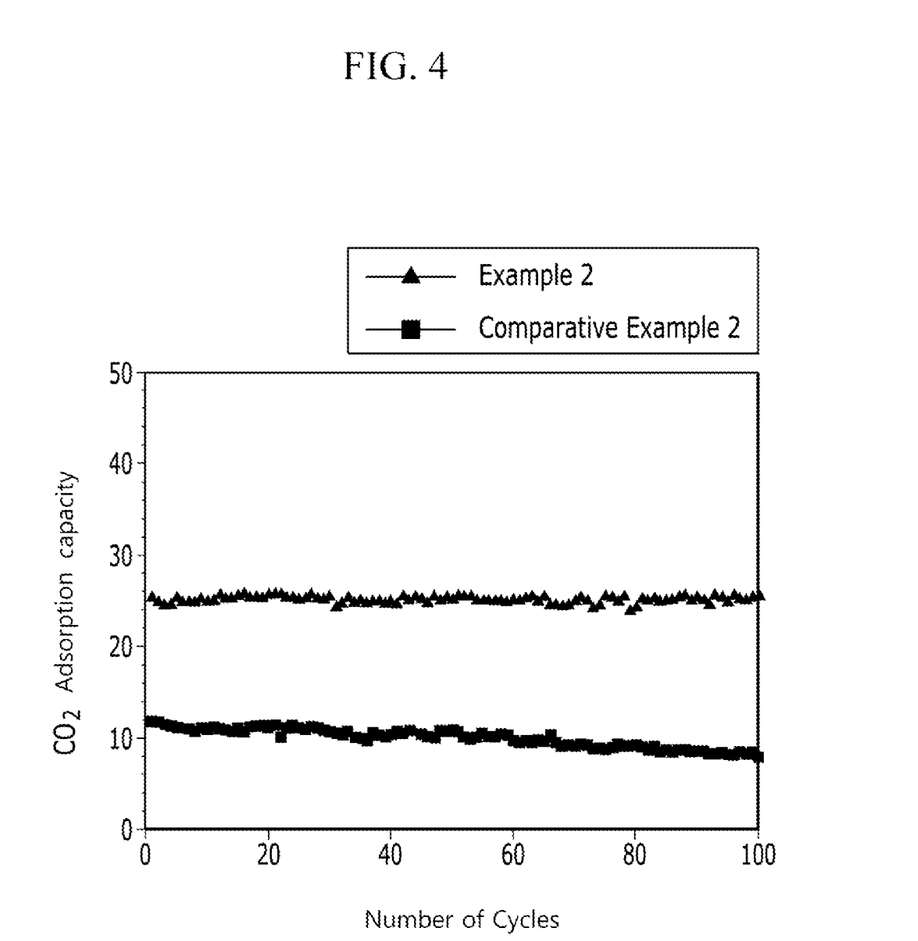
FIG. 4 is a view illustrating the results of isothermal cyclic adsorption experiments for carbon dioxide conducted with using the composite metal oxide of Example 2 and the composite metal oxide of Comparative Example 2.

The results are shown in FIG. 4.

The results of FIG. 4 confirm that the composite metal oxide of Example 2 maintains adsorption capacity of about 25 wt % or higher during 100 cycles and substantially, no changes in the adsorption capacity is observed. By contrast, the composite metal oxide of Comparative Example 2 shows adsorption capacity of about 10 wt % and suffers a noticeable decrease in its adsorption capacity.

While this disclosure has been described in connection with various example embodiments, it is to be understood that the disclosure is not limited to the disclosed embodiments, but, on the contrary, is intended to cover various modifications and equivalent arrangements included within the spirit and scope of the appended claims.

What is claimed is:

1. An adsorbent for carbon dioxide, comprising:
a composite metal oxide including a divalent first metal ($M^1$), a trivalent second metal ($M^2$), and an element (A) having an electronegativity ranging from about 2.0 to about 4.0, the composite metal oxide having an amorphous structure, the element (A) being included in an amount of 0.3 moles to 3 moles per one mole of a sum of the divalent first metal ($M^1$) and the trivalent second metal ($M^2$).

2. The adsorbent for carbon dioxide of claim 1, wherein the composite metal oxide is represented by the following Chemical Formula 1:

[Chemical Formula 1]

in Chemical Formula 1, $M^1$ is a divalent first metal, $M^2$ is a trivalent second metal, A is an element having an electronegativity of about 2.0 to about 4.0, x is in a range of 0.2 to 0.4, y is in a range of 0.3 to 3, and a is a number required for making a charge balance of oxygen with $M^1$, $M^2$, and A.

3. The adsorbent for carbon dioxide of claim 1, wherein the divalent first metal ($M^1$) is selected from an alkaline-earth metal, a transition metal, and a combination thereof.

4. The adsorbent for carbon dioxide of claim 3, wherein the divalent first metal ($M^1$) is selected from the group consisting of magnesium (Mg), calcium (Ca), strontium (Sr), nickel (Ni), manganese (Mn), iron (Fe), cobalt (Co), copper (Cu), zinc (Zn), beryllium (Be), and a combination thereof.

5. The adsorbent for carbon dioxide of claim 1, wherein the trivalent second metal ($M^2$) is different from the divalent first metal ($M^1$) and is selected from a Group 13 element, a transition metal, a lanthanide, and a combination thereof.

6. The adsorbent for carbon dioxide of claim 5, wherein the trivalent second metal ($M^2$) is selected from the group consisting of aluminum (Al), chromium (Cr), manganese (Mn), iron (Fe), cobalt (Co), lanthanum (La), cerium (Ce), gallium (Ga), indium (In), vanadium (V), and a combination thereof.

7. The adsorbent for carbon dioxide of claim 1, wherein the mole ratio ($M^1/M^2$) between the divalent first metal ($M^1$) and the trivalent second metal ($M^2$) in the composite metal oxide is in a range of about 1.5/1 to about 4/1.

8. The adsorbent for carbon dioxide of claim 1, wherein the element (A) having an electronegativity ranging from about 2.0 to about 4.0 is selected from phosphorus (P), boron (B), fluorine (F), sulfur (S), chlorine (Cl), and a combination thereof.

9. The adsorbent for carbon dioxide of claim 8, wherein the electronegativity ranges from about 2.2 to about 4.0.

10. The adsorbent for carbon dioxide of claim 1, wherein the composite metal oxide is a calcined product of a composite metal hydroxide including a divalent first metal ($M^1$), a trivalent second metal ($M^2$), and an element (A) having an electronegativity of about 2.0 to about 4.0 but not including a carbonate anion.

11. The adsorbent for carbon dioxide of claim 1, further comprising:
at least an alkali metal or an oxide of the alkali metal on a surface of the composite metal oxide.

12. A method of manufacturing an adsorbent for carbon dioxide, including a composite metal oxide, which includes a divalent first metal ($M^1$), a trivalent second metal ($M^2$), and an element (A) with an electronegativity ranging from about 2.0 to about 4.0 and has an amorphous structure, the method comprising:
preparing a mixed aqueous solution by dissolving a salt of a divalent first metal and a salt of a trivalent second metal in water;
adjusting pH of the mixed aqueous solution to be basic to precipitate a composite metal hydroxide:
separating the composite metal hydroxide;
mixing the composite metal hydroxide with an aqueous solution of a salt including an element with an electronegativity of about 2.0 to about 4.0 to obtain a mixture;
adjusting pH of the mixture to be equal to or less than about 7 and stirring the mixture to prepare an ion-exchanged composite metal hydroxide;
separating the ion-exchanged composite metal hydroxide from the mixture; and
calcining the ion-exchanged composite metal hydroxide to obtain a composite metal oxide, and
wherein the salts of the divalent first metal and of the trivalent second metal do not include a carbonate anion, the element (A) being included in the composite metal oxide in an amount of 0.3 moles to 3 moles per one mole of a sum of the divalent first metal ($M^1$) and the trivalent second metal ($M^2$).

13. The method of claim 12, wherein the preparing a mixed aqueous solution includes selecting the salt of a divalent first metal from nitrates, acetates, and hydrates thereof, the divalent first metal selected from an alkaline-earth metal, a transition metal, and a combination thereof.

14. The method of claim 13, wherein the salt of a divalent first metal is selected from nitrates, acetates, and hydrates thereof and includes the divalent first metal selected from magnesium (Mg), calcium (Ca), strontium (Sr), nickel (Ni), manganese (Mn), iron (Fe), cobalt (Co), copper (Cu), zinc (Zn), beryllium (Be), and a combination thereof.

15. The method of claim 12, wherein the preparing an mixed aqueous solution includes selecting the salt of a trivalent second metal from nitrates, acetates, and hydrates thereof, the trivalent second metal being different from the divalent first metal and being selected from a Group 13 element, a transition metal, a lanthanide, and a combination thereof.

16. The method of claim 15, the salt of a trivalent second metal is selected from nitrates, acetates, and hydrates thereof, and includes the trivalent second metal selected from aluminum (Al), chromium (Cr), manganese (Mn), iron (Fe), cobalt (Co), lanthanum (La), cerium (Ce), gallium (Ga), indium (In), vanadium (V), and a combination thereof.

17. The method of claim 12, wherein the adjusting pH of the mixed aqueous solution includes modifying the pH of the mixed aqueous solution to a range of about 9 to about 12.

18. The method of claim 12, wherein the method further comprises aging the composite metal hydroxide with stirring at a temperature of 60° C. or lower.

19. The method of claim 12, wherein the method further comprises drying the composite metal hydroxide at a temperature of 60° C. or lower and under a pressure of atmospheric pressure or lower.

20. The method of claim 12, wherein the ion-exchanged composite metal hydroxide is represented by the following Chemical Formula 2, $$[M^1{}_{1-x}M^2{}_x(OH)_2]^{x+}[((A^1)_y(A^2)_z(A^3)_{1-y-z})^{n-}{}_{x/n}]^{x-} \cdot mH_2O.$$ [Chemical Formula 2]

wherein $M^1$ is the divalent first metal, $M^2$ is the trivalent second metal, $A^1$ is an anion of the salt of the divalent first metal, $A^2$ is an anion of the salt of the trivalent second metal, $A^3$ is an anion of the salt including an element having an electronegativity ranging from about 2.0 to about 4.0, each of x, y, and z is in a range of about 0.2 to about 0.4, y+z is less than 1, n is determined depending on valences of the anion $A^1$, the anion $A^2$, and the anion $A^3$, and m is in a range of about 0 to about 8.

21. The method of claim 20, wherein the anion ($A^1$) of the salt of the divalent first metal and the anion ($A^2$) of the salt of the trivalent second metal is selected from a nitrate ion ($NO_3^-$), an acetate ion ($CH_3COO^-$), and a combination thereof.

22. The method of claim 12, wherein the salt including an element having an electronegativity ranging from about 2.0 to about 4.0 has an anion selected from a phosphate ion ($PO_4^{3-}$), a borate ion ($BO_3^{3}$), a sulfate ion ($SO_4^{2-}$), a peroxosulfate ion ($SO_2O_8^{2-}$), a chloride ion ($Cl^-$), a chlorate ion ($ClO_4^-$), a fluoride ion ($F^-$), and a combination thereof.

23. The method of claim 12, wherein the salt including an element having an electronegativity ranging from about 2.0 to about 4.0 has a cation selected from $K^+$, $Ca^{2+}$, $NH_4^+$, $Na^+$, and a combination thereof.

24. The method of claim 12, wherein the adjusting the pH of the mixture to be equal to or less than 7 includes maintaining the pH of the mixture in a range of about 3 to about 6 to facilitate the formation of the ion-exchanged composite metal hydroxide.

25. The method of claim 12, wherein the calcining is performed at a temperature ranging from about 200° C. to about 700° C.

26. A capture module for carbon dioxide comprising the adsorbent for carbon dioxide according to claim 1.

* * * * *